(12) United States Patent
Kaufmann (10) Patent No.: US 11,385,358 B2
(45) Date of Patent: Jul. 12, 2022

(54) METHOD AND APPARATUS FOR USING DUAL-POLARIZATION ANTENNA

(71) Applicant: u-blox AG, Thalwil (CH)

(72) Inventor: Thomas Kaufmann, Zurich (CH)

(73) Assignee: U-BLOX AG, Thalwil (CH)

( * ) Notice: Subject to any disclaimer, the term of this patent is extended or adjusted under 35 U.S.C. 154(b) by 209 days.

(21) Appl. No.: 16/727,886

(22) Filed: Dec. 26, 2019

(65) Prior Publication Data

US 2021/0199813 A1    Jul. 1, 2021

(51) Int. Cl.
| | | |
|---|---|---|
| G01S 19/37 | (2010.01) | |
| H01Q 9/04 | (2006.01) | |
| G01S 19/22 | (2010.01) | |
| G01S 19/36 | (2010.01) | |

(52) U.S. Cl.
CPC .............. *G01S 19/37* (2013.01); *G01S 19/22* (2013.01); *G01S 19/36* (2013.01); *H01Q 9/0435* (2013.01)

(58) Field of Classification Search
CPC ........... G01S 19/22; G01S 19/36; G01S 19/37
See application file for complete search history.

(56) References Cited

U.S. PATENT DOCUMENTS

| | | | | |
|---|---|---|---|---|
| 5,995,044 A * | 11/1999 | Kunysz | ................. | G01S 19/22 342/363 |
| 6,380,896 B1 * | 4/2002 | Berger | ................. | H01Q 9/0435 343/700 MS |
| 7,212,921 B2 * | 5/2007 | Jeerage | ................. | G01S 19/09 701/472 |
| 8,098,197 B1 * | 1/2012 | Herting | ................. | H01Q 9/0492 342/365 |
| 9,835,729 B2 * | 12/2017 | Wallace | ................. | G01S 19/41 |
| 10,038,508 B1 * | 7/2018 | Kerselaers | ........... | H04B 17/104 |
| 11,139,590 B2 * | 10/2021 | Kaufmann | ......... | H01Q 21/0006 |
| 2002/0045427 A1 * | 4/2002 | Lahti | ....................... | G01S 19/22 455/97 |
| 2009/0195449 A1 * | 8/2009 | Bedell | ..................... | G01S 19/22 342/357.61 |
| 2018/0224557 A1 * | 8/2018 | McMilin | ............... | G01S 19/215 |

OTHER PUBLICATIONS

Wim De Wilde, Jean-Marie Sleewaegen, Bruno Bougard, Gert Cuypers, Alexander Popugaev, Markus Landman, Christopher Schirmer, Daniel Egea Roca, Jose A. Lopez-Salcedo, and Gonzalo Seco Granados, "Authentication by Polarization: A Powerful Anti-Spoofing Method," *Proceedings of the 31st International Technical Meeting of the Satellite Division of the Institute of Navigation (ION GNSS+ 2018)*, Miami, Florida, pp. 3643-3658 (Sep. 2018).

(Continued)

*Primary Examiner* — Gregory C. Issing
(74) *Attorney, Agent, or Firm* — Finnegan, Henderson, Farabow, Garrett & Dunner LLP (57) ABSTRACT

An apparatus includes an antenna assembly including an antenna configured to receive a signal and, based on the received signal, generate a first linearly polarized signal at a first feed point and a second linearly polarized signal at a second feed point; and a switching circuit configured to periodically switch between the first feed point and the second feed point to select a polarized signal between the first and second polarized signals at a point in time based on a switching signal.

11 Claims, 6 Drawing Sheets

(56) References Cited

OTHER PUBLICATIONS

Ziyi Jiang and Paul D. Groves, "NLOS GPS Signal Detection Using a Dual-Polarisation Antenna," *GPS Solutions*, 18.1, pp. 15-26 (2014).

Daniel Egea-Roca, Antonio Tripiana-Caballero, José A. López-Salcedo, Gonzalo Seco-Granados, Wim De Wilde, Bruno Bougard, Jean-Marie Sleewaegen and Alexander Popugaev, "Design, Implementation and Validation of a GNSS Measurement Exclusion and Weighting Function with a Dual Polarized Antenna," *Sensors*, 18(12), 4483 (2018).

Jimmy LaMance and David Small, "Locata Correlator-Based Beam Forming Antenna Technology for Precise Indoor Positioning and Attitude," *Proceedings of ION GNSS 2011*, the 24th International Technical Meeting of the Satellite Division of the Institute of Navigation, Portland, Oregon, pp. 2436-2445 (Sep. 19-23, 2011).

Gautham Krishnamurthy and Kevin G. Gard, "Time Division Multiplexing Front-Ends for Multiantenna Integrated Wireless Receivers," *IEEE Transactions on Circuits and Systems*, I, Reg. Papers, vol. 57, No. 6, pp. 1231-1243 (Jun. 2010).

\* cited by examiner

METHOD AND APPARATUS FOR USING DUAL-POLARIZATION ANTENNA

FIELD

The present disclosure relates generally to an antenna, and more particularly, to apparatus including a dual-polarization antenna assembly capable of switching between two feed points and method for operating thereof.

BACKGROUND

A global navigation satellite system (GNSS) receiver receives a satellite signal transmitted from a GNSS satellite constellation through an antenna. Before arrival at the antenna, the satellite signal may be scattered, reflected, or refracted in space, for example, by mountains or buildings, causing multipath interference at the antenna. Or the antenna may suffer from a spoofing attack that deceives the receiver with false signals.

Multipath interference and spoofing may be mitigated by adding hardware (e.g., a multi-antenna array) in the receiver's frontend and additional signal processing blocks in the receiver's backend. However, this increases the size and cost of the receiver.

SUMMARY

According to some embodiments of the present disclosure, there is provided an apparatus. The apparatus includes an antenna assembly including an antenna configured to receive a signal and, based on the received signal, generate a first linearly polarized signal at a first feed point and a second linearly polarized signal at a second feed point; and a switching circuit configured to periodically switch between the first feed point and the second feed point to select a polarized signal between the first and second polarized signals at a point in time based on a switching signal. The apparatus may further include a receiver, coupled to receive the selected polarized signal, configured to: process the selected polarized signal to generate at least a right-hand circular polarized (RHCP) signal; and generate the switching signal.

According to some embodiments of the present disclosure, there is also provided an apparatus including an antenna assembly. The antenna assembly includes: an antenna configured to receive a signal and, based on the received signal, generate a plurality of first linearly polarized signals and a plurality of second linearly polarized signals; a first hybrid coupler configured to combine the plurality of first linearly polarized signals to form a first combined polarized signal; a second hybrid coupler configured to combine the plurality of second linearly polarized signals to form a second combined polarized signal; and a switching circuit configured to periodically switch between the first hybrid coupler and the second hybrid coupler to select a polarized signal between the first combined polarized signal and the second combined polarized signal at a point in time based on a switching signal.

According to some embodiments of the present disclosure, there is also provided a method for operating a device, wherein the device includes a receiver configured to generate a switching signal and an antenna configured to receive a signal and generate a first linearly polarized signal and a second linearly polarized signal having polarization directions different from each other. The method includes: generating the switching signal; time-division multiplexing the first polarized signal and the second polarized signal using a switch included in the antenna based on the switching signal to provide a time-division multiplexed signal; receiving, by a first correlator subchannel and a second correlator subchannel, at least a portion of the time-division multiplexed signal; processing, by the first correlator subchannel, a right-hand circular polarized (RHCP) signal by periodically switching a numerically controlled oscillator of the first correlator channel between 0° and +90° or between 0° and −90° at each switching point of time of the first polarized signal and the second polarized signal; processing, by the second correlator subchannel, a left-hand circular polarized (LHCP) signal by periodically switching a numerically controlled oscillator of the second correlator channel between 0° and −90° or between 0° and +90° at each switching point of the first polarized signal and the second polarized signal; and recombining the RHCP and LHCP signals after correlation.

According to some embodiments of the present disclosure, there is further provided a non-transitory computer-readable medium having stored therein instructions that, when executed by a processor, perform a method for controlling a device, the method comprising: generating, by the device, a switching signal; transmitting, to an antenna assembly, the generated switching signal so that the switching signal drives a switch in the antenna assembly; receiving, by a first correlator subchannel and a second correlator subchannel of the device, at least a portion of a time-division multiplexed signal generated by the antenna assembly by periodically selecting a polarized signal from a first polarized signal and a second polarized signal; processing, by the first correlator subchannel of the device, a right-hand circular polarized (RHCP) signal by periodically switching a numerically controlled oscillator of the first correlator channel between 0° and +90° or between 0° and −90° at each switching point of time of the first polarized signal and the second polarized signal; processing, by the second correlator subchannel of the device, a left-hand circular polarized (LHCP) signal by periodically switching a numerically controlled oscillator of the second correlator channel between 0° and −90° or between 0° and +90° at each switching point of the first polarized signal and the second polarized signal; and recombining the RHCP and LHCP signals after correlation.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of systems, apparatuses, and methods consistent with aspects related to the present disclosure as recited in the appended claims.

Multipath interference causes severe problems in GNSS navigation solutions, especially in a complex propagation environment (e.g., mountains, buildings, urban canyons, foliage, etc.). A GNSS satellite transmits a right hand circularly polarized (RHCP) electromagnetic wave. However, in a complex propagation environment, the direction of rotation of the electric field vector of the RHCP electromagnetic wave can be changed due to an interaction of the electromagnetic wave with the environment. For example, for an electromagnetic wave striking on a hard surface for electromagnetic waves with an angle of incidence less than Brewster's angle, reflection by the hard surface can change the direction of polarization of the electromagnetic wave. As a result, the RHCP electromagnetic wave may flip to a left-hand circular polarized (LHCP) electromagnetic wave, and a GNSS receiver in the complex environment may receive LHCP electromagnetic waves at a much stronger magnitude than in an open-sky environment, causing severe problems in GNSS navigation solutions.

Spoofing attacks are another challenge in GNSS navigation solutions. For example, a disguised signal transmitted from an unknown source attempts to deceive a GNSS receiver and therefore, is a significant threat in autonomous vehicles that rely on trustworthy global position information.

Multipath interference and spoofing in a GNSS receiver may be mitigated by adding hardware in the receiver's frontend, for example, using a multiple-antenna array, and additional signal processing blocks in the receiver's backend. However, this increases the size of the receiver and adds cost to the receiver design. Moreover, using a multiple-antenna array causes complexity in operation, for example, by requiring calibration of the multiple antennas.

On the other hand, a receiver utilizing a single antenna usually uses RHCP signals only. A high-end receiver utilizing an expensive single antenna may be designed to use both RHCP and LHCP signals, but the receiver is cumbersome to deploy as it requires a hybrid coupler, two coaxial RF cables to transmit the RHCP and LHCP signals to the receiver, and two RF chains in the receiver to process the RCHP and LHCP signals. In addition, the receiver consumes more power than a normal receiver does.

Embodiments of the present disclosure provide an apparatus comprising an antenna assembly and a receiver. In some embodiments, the antenna assembly includes an antenna including a first feed point that generates a first linearly polarized signal and a second feed point that generates a second linearly polarized signal. The antenna assembly also includes a switching circuit including a switch that periodically switches between the first feed point and the second feed point to select a polarized signal between the first linearly polarized signal and the second linearly polarized signal at a point in time, to form a time-division multiplexed signal. The multiplexed signal is then transmitted to the receiver. In some embodiments, the receiver includes a correlator including a plurality of correlator channels each assigned to a different one of a plurality of signals transmitted from corresponding ones of a plurality of satellites. Each of the plurality of correlator channels further includes a first subchannel and a second subchannel, that are configured to process RHCP and LHCP signals, respectively. In some embodiments, the receiver determines a cross-polarization ratio (XPR) for each of the plurality of satellite signals to quantify an effect of multipath on each of the plurality of satellite signals and de-weights one or more signals whose XPR values exceed a threshold value. In some embodiments, the receiver tracks both RHCP and LHCP signals. In some embodiments, the receiver promptly adjusts the number of channels and/or signals used for LHCP tracking during operation, based on a need for a critical measurement.

Embodiments disclosed in the present disclosure have one or more technical effects. By switching between the two different antenna feed points to time-division multiplex the two signals having different linear polarization directions and processing the time-division multiplexed signal in the digital domain, a need for a 90° hybrid coupler, two RF cables, and two RF chains in the receiver is eliminated, leading to a reduced size, a reduced cost, and reduced power consumption. In addition, a hybrid coupler may be temperature sensitive, so eliminating the need for use of the hybrid coupler enables operation free of the effects due to temperature fluctuation. Quantifying multipath effect on each of the plurality of satellite signals and de-weighting one or more signals based on XPR values allows for enhanced measurement efficiency and effectiveness without increasing the size and the cost of the receiver. Tracking both RHCP and LHCP signals allows for assessment of a signal propagation environment and provides details about the quality of the received signals at a minimal cost. On the other hand, promptly adjusting the number of channels and/or signals used for LHCP tracking based on need for a multipath interference measurement allows for enhanced flexibility of operation and reduced power consumption.

Figure 1:
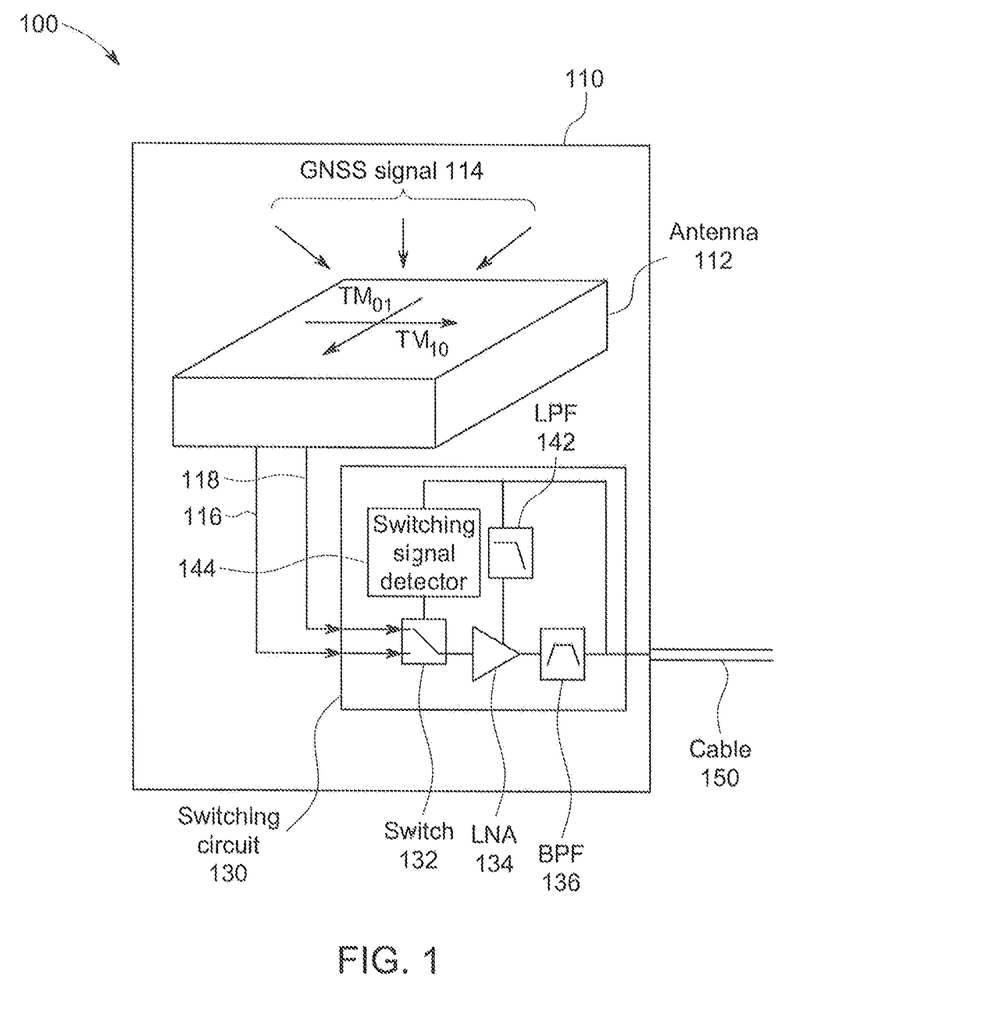
FIG. 1 is a schematic diagram illustrating a dual-feed antenna assembly, consistent with some embodiments of the present disclosure.

FIG. 1 is a schematic diagram illustrating a dual-feed antenna assembly, consistent with some embodiments of the present disclosure. Referring to FIG. 1, an apparatus 100 includes an antenna assembly 110 including an antenna 112 and a switching circuit 130. Antenna 112 is configured to receive a GNSS signal 114. In an embodiment, GNSS signal 114 may be a single satellite band signal transmitted from a single satellite. In another embodiment, GNSS signal 114 may include a plurality of satellite band signals respectively transmitted from a plurality of satellites. In an embodiment, GNSS signal 114 may include signals originating from one or more virtual sources that reflect and/or scatter satellite signals. In an embodiment, GNSS signal 114 may include satellite signals refracted at an interface between two mediums. However, the signals received by antenna 112 are not limited to satellites signals, and can be any electromagnetic waves transmitted from any sources, for example, wireless cellular signals.

Antenna 112 includes a first feed point (not shown) that generates a first linearly polarized signal 116 and a second feed point (not shown) that generates a second linearly polarized signal 118. The first linearly polarized signal 116 and the second linearly polarized signal 118 are orthogonal in x-y direction, for example, as shown as the transverse magnetic 01 (TM01) mode and the transverse magnetic 10 (TM10) mode in FIG. 1. In another embodiment, the first and second linearly polarized signals 116 and 118 form a ±45° system in which one of the two signals is polarized in the +45° direction and the other signal is polarized in the −45° direction. Antenna 112 may be any antenna (e.g., a patch antenna, a helix antenna, a crossed bow antenna, etc.) that can have at least two internal ports.

Switching circuit 130 includes a switch 132 that periodically switches between the first feed point and the second feed point to select a polarized signal between the first linearly polarized signal 116 and the second linearly polarized signal 118 at a point in time, to form a time-division multiplexed signal. The time-division multiplexed signal is a combination of the sampled first linearly polarized signal 116 and the sampled second linearly polarized signal 118 that form a single signal path. The switching may be done at a rate sufficiently high for the sampled signal to be recoverable by signal processing at a receiver. For example, a switching period may be less than 1 ms. The switching in switch 132 is controlled by a switching signal which may be a pulse signal or an alternating current (AC) signal. The details of the switching signal will be described below with respect to FIG. 2.

Switching circuit 130 may include a switching signal detector 144 that detects the switching signal. Switching signal detector 144 may be selected based on a type of the switching signal. For example, if the switching signal consists of different amplitude levels, a comparator can be used as switching signal detector 144.

By using a switch to switch between the two different antenna feed points and time-division multiplexing the two signals having different polarization directions, a need for use a 90° hybrid coupler, two RF cables, and two RF chains in the receiver is eliminated, leading to a reduced size, a reduced cost and reduced power consumption. In addition, a hybrid coupler may be temperature sensitive, so eliminating the need for use of the hybrid coupler enables operation free of the effects due to temperature fluctuation.

Switching circuit 130 may include a low noise amplifier (LNA) 134 that is coupled to switch 132 and configured to amplify the time-division multiplexed signal. LNA 134 may be supplied by a direct current (DC) bias which will be described in detail below with respect to FIG. 2. In an embodiment, a low pass filter (LPF) 142 may be implemented in the path of the DC bias so that the switching signal that is superimposed on the DC bias can be filtered out before the DC bias is supplied to LNA 134. In an embodiment, LNA 134 may comprise a controller that controls parameters of an amplified signal. The parameters may include at least one of: gain, noise, linearity, bandwidth, output dynamic range, slew rate, rise rate, overshoot, or stability factor.

Switching circuit 130 may include a bandpass filter (BPF) 136 that is coupled to LNA 134 and configured to filter the amplified signal to suppress frequencies outside a range of interest. The filtered and amplified signal is then transmitted to a receiver through cable 150, as described below with respect to FIG. 2. Cable 150 may be a coaxial RF cable or any other cable suitable for transmitting an RF signal.

Performing filtering and amplification of the time-division multiplexed signal on the antenna side and the digital signal processing in the receiver side allows for an enhanced immunity of the operation to temperature drifts.

In an embodiment, at least one of LNA 134 and BPF 136 may be implemented in the receiver side, rather than in the antenna side. In another embodiment, both antenna assembly 110 and the receiver may include an LNA and a BPF.

Figure 2:
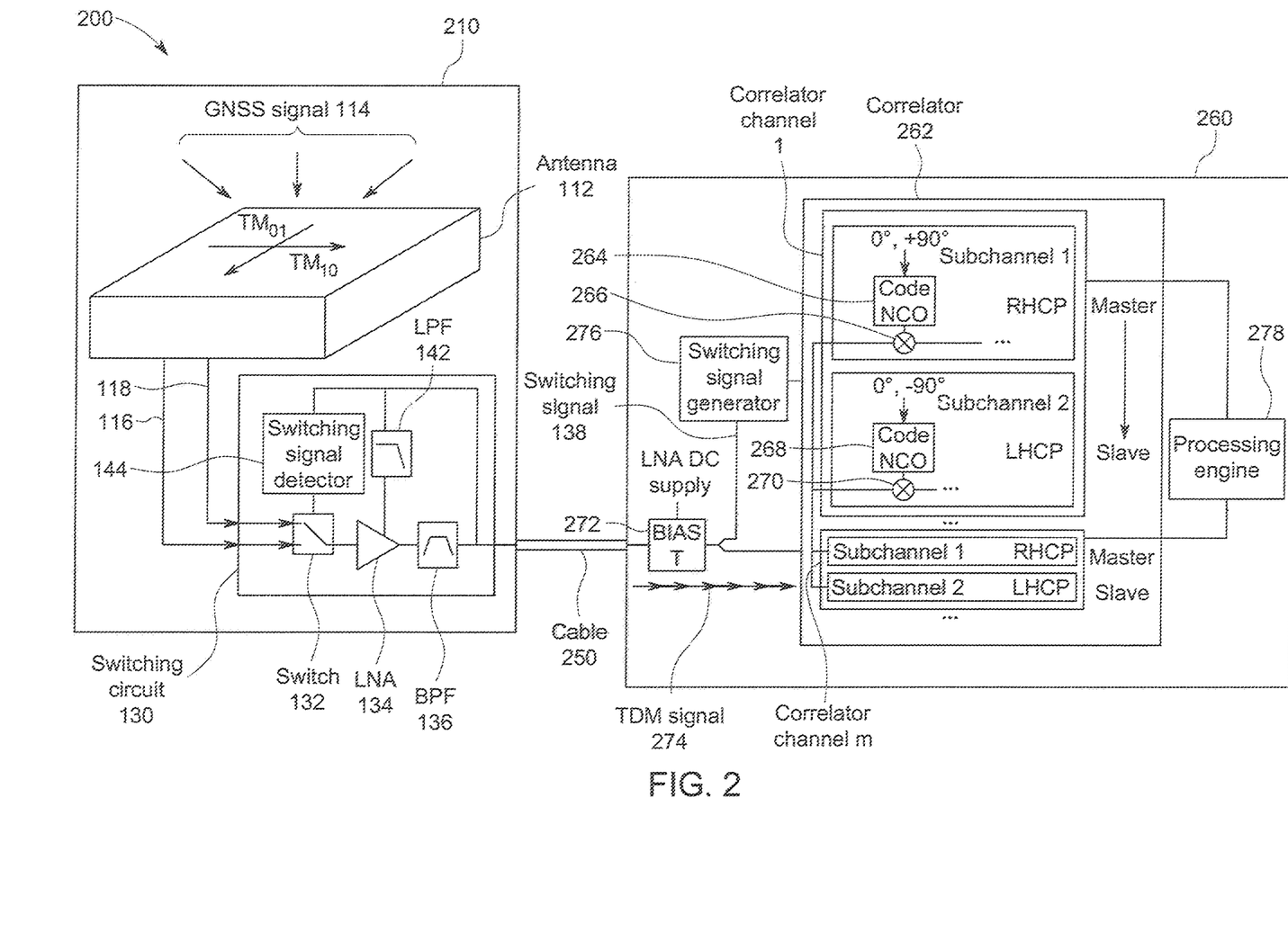
FIG. 2 is a schematic diagram illustrating an apparatus including an antenna assembly and a receiver, consistent with some embodiments of the present disclosure.

FIG. 2 is a schematic diagram illustrating an apparatus including an antenna assembly and a receiver, consistent with some embodiments of the present disclosure. Referring to FIG. 2, an apparatus 200 includes an antenna assembly 210, a receiver 260 and a cable 250 that connects antenna assembly 210 and receiver 260. The configuration of antenna assembly 210 is similar to that of antenna assembly 110 of FIG. 1. The same components are denoted by the same reference symbols and their description will not be repeated.

Receiver 260 includes a bias tee (bias T) circuit 272 that supplies a DC bias signal. The DC bias signal is transmitted to LNA 134 of switching circuit 130 through cable 250.

Receiver 260 includes a switching signal generator 276 that generates switching signal 138. Switching signal generator 276 may be a pulse signal generator or an AC signal generator. Switching signal 138 may be a synchronized signal formed by mixing a signal generated by switching signal generator 276 with a local oscillating signal provided by a local oscillator (not shown). A switching period may be in the order of 1 ms. Switching signal 138 is transmitted to switching circuit 130 of antenna assembly 210 through cable 250 such that switch 132 switches between the first feed point and the second feed point of antenna 112 under the control of switching signal 138.

In an embodiment, switching signal 138 may be a pulse signal that includes positive pulses and negative pulses. The first feed point of antenna 112 may be provided with the positive pulses of switching signal 138, and the second feed point of the antenna 112 may be provided with the negative pulses of switching signal 138. Alternatively, the first feed point of antenna 112 may be provided with the negative pulses of switching signal 138, and the second feed point of the antenna 112 may be provided with the positive pulses of switching signal 138. A length of a pulse may be on the order of 100 μs or less, and an amplitude of the pulse may be on the order of a few volts.

In an embodiment, the DC bias signal supplied by bias T circuit 272 and switching signal 138 are superimposed and transmitted from receiver 260 to antenna assembly 210 through the same cable 250. In such a case, a low pass filter 142 that filters switching signal 138 can be implemented in the path of the DC bias signal before the DC bias signal is provided to LNA 134.

Switching circuit 130 may perform time-division multiplexing on the first and second polarized signals based on switching signal 138. The time-division multiplexed signal may be amplified by LNA 134 and then filtered by BPF 136. The amplified and filtered time-division multiplexed signal is then transmitted to receiver 260 through cable 250, as a time-division multiplexed (TDM) signal 274 in FIG. 2.

Receiver 260 includes a correlator 262. Correlator 262 includes a plurality of correlator channels, starting from a correlator channel 1 to a correlator channel m, and to a correlator channel n (not shown), where n is a natural number greater than 1. Each of the plurality of correlator channels is configured to receive TDM signal 274. Each of the plurality of correlator channels further includes two subchannels. For example, correlator channel 1 includes a subchannel 1 and a subchannel 2. Similarly, correlator channel m includes a subchannel 1 and a subchannel 2. Each subchannel includes a numerically controlled oscillator (NCO) coupled to a mixer. The NCO may be a code generator NCO, identified as Code NCO in FIG. 2. For example, subchannel 1 of correlator channel 1 includes a Code NCO 264 coupled to a mixer 266 and subchannel 2 of correlator channel 1 includes a Code NCO 268 coupled to a mixer 270. In each subchannel, the incoming TDM signal 274 is mixed by the mixer with a local oscillating signal generated by the NCO of the subchannel. Receiver 260 includes a processing engine 278. Processing engine 278 may be connected to each of the plurality of correlator channels and controls the process in each of the plurality of correlator channels. In an embodiment, processing engine 278 may be implemented as software and the operations of processing engine 278 can be accomplished by a program stored in a computer-readable medium and executed by a processor. The processor may be implemented inside receiver 260. In another embodiment, processing engine 278 may be implemented as hardware that includes the program and a processor configured to execute the program to perform the functions of the engine.

Subchannel 1 of each of the correlator channels forms a right-hand circular polarized (RHCP) signal by periodically switching the NCO of the subchannel between 0° and +90° or between 0° and −90° at each switching point of time of the first and second feed points of antenna 112, to introduce a +90° or −90° phase shift between the first linearly polarized signal and the second linearly polarized signal. Similarly, subchannel 2 of each of the correlator channels forms a left-hand circular polarized (LHCP) signal by periodically switching the NCO of the subchannel between 0° and −90° or between 0° and +90° at each switching point of time of the first and second antenna feed points of antenna 112, to introduce a −90° or +90° phase shift between the first linearly polarized signal and the second linearly polarized signal.

For example, when subchannel 1 of correlator channel 1 forms a RHCP signal by periodically switching NCO 264 of subchannel 1 between 0° and +90° at each switching point of time of the first and second feed points of antenna 112, subchannel 2 of correlator channel 1 forms a LHCP signal by periodically switching NCO 268 of subchannel 2 of correlator channel 1 between 0° and −90° at each switching point of time of the first and second antenna feed points of antenna 112. Similarly, when subchannel 1 of correlator channel 1 forms a RHCP signal by periodically switching NCO 264 of subchannel 1 between 0° and −90° at each switching point of time of the first and second feed points of antenna 112, subchannel 2 of correlator channel 1 forms a LHCP signal by periodically switching the NCO 268 of subchannel 2 of correlator channel 1 between 0° and +90° at each switching point of time of the first and second antenna feed points of antenna 112. In this way, a +90° or −90° phase shift between the first linearly polarized signal and the second linearly polarized signal is introduced without using a hardware component such as a 90° hybrid coupler.

Introducing the +90° or the −90° phase shift between the first linearly polarized signal and the second linearly polarized signal in the digital domain, rather than using a hybrid coupler, ensures reduced size, cost, and power consumption, and enhanced immunity to temperature fluctuations.

In an embodiment, subchannel 1 and subchannel 2 of each of the plurality of correlator channels may operate in a master-slave configuration. For example, subchannel 1 of correlator channel 1 may be configured as a master channel to process the RHCP signal, and subchannel 2 of correlator channel 1 may be configured as a slave channel to process the LHCP signal based on an instruction from subchannel 1 of correlator channel 1. Similarly, subchannel 1 of correlator channel m may be configured as a master channel to process the RHCP signal, and subchannel 2 of correlator channel m may be configured as a slave channel to process the LHCP signal based on an instruction from subchannel 1 of correlator channel m. In this configuration, tracking (e.g., phase, frequency, and code tracking) of the LHCP signal is guided by the RHCP master channel. For example, receiver 260 may only track the RHCP signal and replicate the local code and carrier timing of the RHCP tracking to the slave channel.

In the case that the received GNSS signal includes a plurality of signals transmitted from a plurality of corresponding satellites, the master channel may promptly determine a number of the plurality of correlator channels and/or a number of the plurality of signals to be used for LHCP tracking, based on a need to assess a critical measurement. In this way, a real-time allocation of the number of channels and/or the signals to be used for LHCP tracking is achieved, leading to enhanced flexibility and reduced power consumption of the system.

In an embodiment, subchannel 1 and subchannel 2 of each of the plurality of correlator channels may operate in an independent configuration. For example, subchannel 2 may track the LHCP signal independently from the RHCP signal in subchannel 1. In an embodiment, a first portion of the plurality of correlator channels may operate in the master-slave configuration and the remaining portion of the plurality of correlator channels may operate in the independent configuration.

Tracking both RHCP and LHCP signals allows for assessing a signal propagation environment and providing details about the quality of the received signals.

Receiver 260 may be configured to compute an XPR to quantify an effect of multipath interference. In an embodiment, XPR may be computed as a ratio of a power of the RHCP signal to a power of the LHCP signal. Receiver 260 may further perform a signal clustering analysis using the computed XPR to detect an effect of spoofing.

In an embodiment, GNSS signal 114 received by antenna 112 includes a plurality of signals respectively transmitted from a plurality of different satellites. In this embodiment, each of the plurality of correlator channels (correlator channel 1 to correlator channel n) of correlator 262 in receiver 260 may be assigned to a different one of the plurality of signals. Each of the plurality of different satellite signals may have a corresponding one of a plurality of pseudo-random noise (PRN) codes, and each of the plurality of satellite signals may be assigned to a different one of the plurality of correlator channels based on the PRN codes of the satellite signals. Each correlator channel may perform correlation of the signal received from a corresponding satellite independently. In this embodiment, receiver 260 may be configured to compute an XPR to quantify an effect of multipath interference on each of the plurality of signals. Receiver 260 may further exclude or de-weight one or more of the plurality of signals whose XPR values exceed a threshold value. Receiver 260 may check XPR values for some satellites, for example, one or more satellites typically used in navigation may be checked more frequently than other satellites. Also, one or more satellite signals that are affected by multipath interference can be selectively de-weighted based on the level of the interference, thereby ensuring navigation accuracy. In this way, a single receiver may function as multi-GNSS constellation receivers, thereby enhancing measurement efficiency and effectiveness without increasing the size and the cost of the receiver.

Figure 3:
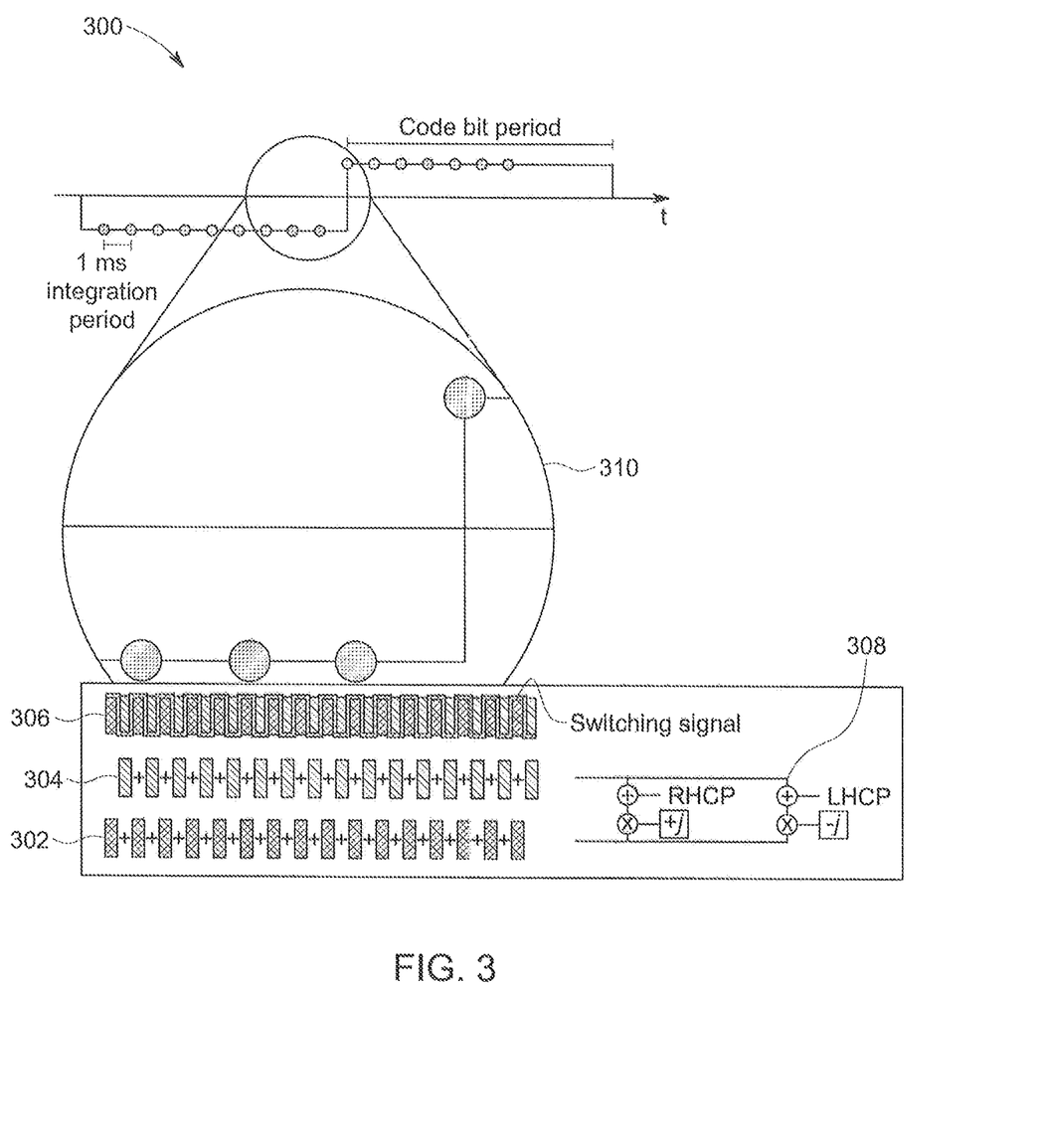
FIG. 3 is a schematic diagram illustrating a method of post-correlation recombination, consistent with some embodiments of the present disclosure.

In an embodiment, processing engine 278 of receiver 260 may perform a recombination of the correlated RHCP signal and LHCP signal, as described with respect to FIG. 3.

FIG. 3 is a schematic diagram illustrating a method for post-correlation recombination, consistent with some embodiments of the present disclosure. The post-correlation recombination may be performed by a processing engine of a receiver, such as processing engine 278 in FIG. 2. The processing engine combines a correlated first signal from a first polarization (the hatched rectangles) in a region 302 and a correlated second signal from a second polarization (the hatched rectangles) in a region 304. The incoming signal is shown in a region 306, with a first series of patches (the first hatched rectangles corresponding to the signal in region 302) illustrating the signal from the first polarization and a second series of patches (the second hatched rectangles corresponding to the signal in region 304) illustrating the signal from the second polarization. The switching signal is shown as a consecutively positive and negative binary signal in region 306. Both correlations occur in the same correlator channel, with the results buffered in two separate memory locations. The RHCP and LHCP signals are obtained by combining the output of these two signals with either a +90° or −90° phase shift in between. Referring to FIG. 3, the time (t)-axis at the top of the figure indicates the processing time of a signal in the receiver. The dots on the taxis indicate a period of correlating the incoming signal with an integration time of 1 ms. As an example, FIG. 3 shows a period of a code bit (solid line above and below the t-axis) for Global Positioning System (GPS) L1 at a period of 20 ms (four dots above the t-axis are omitted). The recombination of the correlated signal from the first and second polarizations may be performed at a late stage of the correlation operation or at the onset of the code bit tracking operation. The incoming signal is magnified and shown in a region 310 of FIG. 3. The processing engine of the receiver separately correlates the incoming time-division multiplexed signal and generates the correlated first polarized signal in region 302 and the correlated second polarized signal in region 304. The resulting correlated signals from the first and second polarized signal are summed independently, indicated as '+' (plus) signs in regions 304 and 302. As shown by operations 308, the recombination is done by adding the two interleaved correlated signals by either a +90° (+j) or −90° (−j) phase shift to obtain the correlated RHCP and LHCP signals. The switching period of the switching signal that controls the switching between the first and second polarized signals at the antenna assembly is smaller than the integration period at the receiver. For example, the switching period may be a fraction of the integration period at the receiver.

Figure 4:
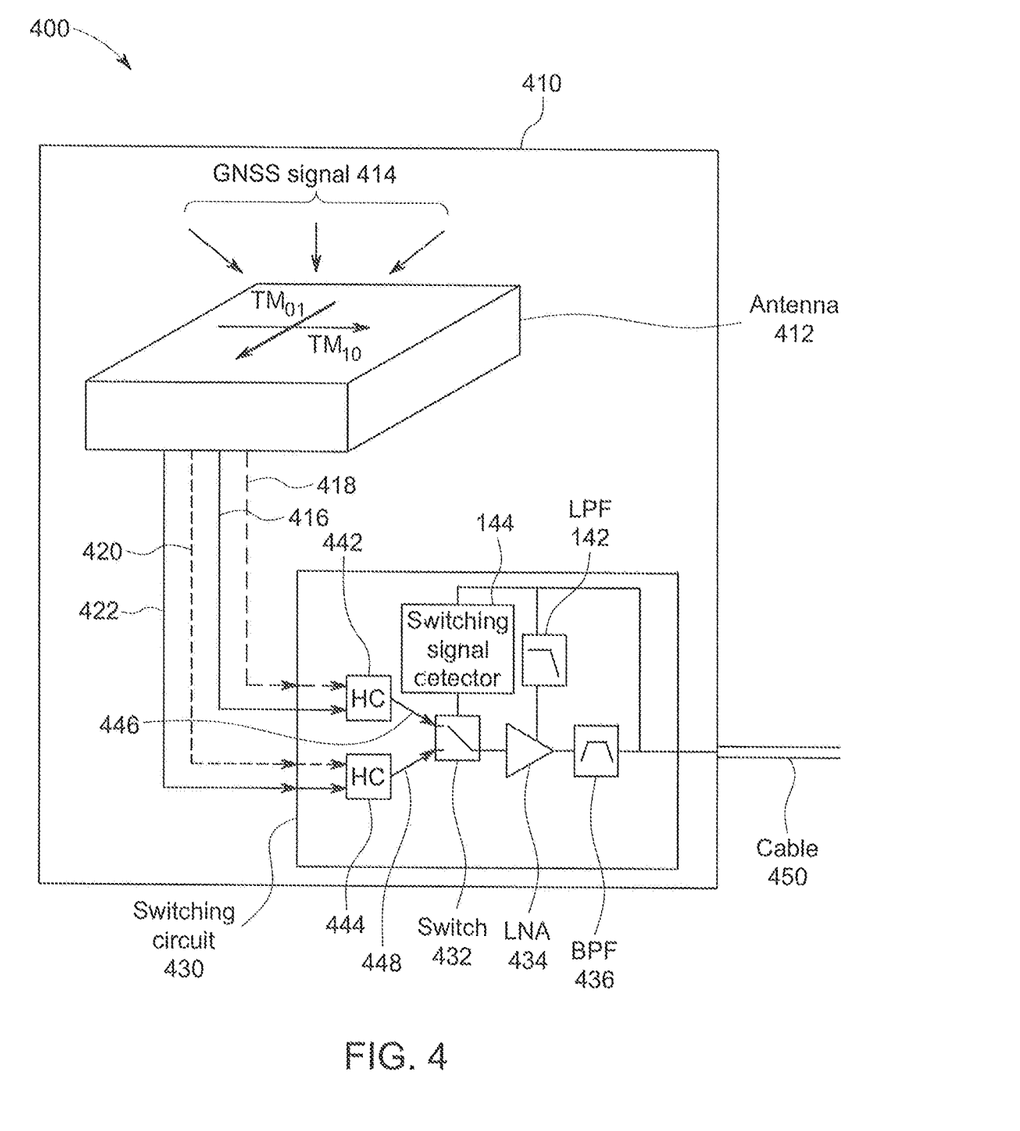
FIG. 4 is a schematic diagram illustrating a quad-feed antenna assembly, consistent with some embodiments of the present disclosure.

FIG. 4 is a schematic diagram illustrating a quad-feed antenna assembly, consistent with some embodiments of the present disclosure. Referring to FIG. 4, an apparatus 400 includes an antenna assembly 410 including an antenna 412 and a switching circuit 430. Antenna 412 is configured to receive a GNSS signal 414. In an embodiment, GNSS signal 414 may be a single satellite band signal transmitted from a single satellite. In an embodiment, GNSS signal 414 may include a plurality of satellite bands signals respectively transmitted from a plurality of satellites. In an embodiment, GNSS signal 414 may include signals originated from one or more virtual sources that reflect and/or scatter satellite signals. In an embodiment, GNSS signal 414 may include satellite signals refracted by an interface between two mediums. However, the signals received by antenna 412 are not limited to satellite signals and can be any electromagnetic waves transmitted from any sources.

Antenna 412 includes a first feed point (not shown) and a second feed point (not shown) that generate a first linearly polarized signal 416 and a second linearly polarized signal 418, respectively. Antenna 412 also includes a third feed point (not shown) and a fourth feed point (not shown) that generate a third linearly polarized signal 420 and a fourth linearly polarized signal 422, respectively. The first linearly polarized signal 416 and the second linearly polarized signal 418 may be polarized in the same direction, denoted TM10 in FIG. 4. Similarly, the third linearly polarized signal 420 and the fourth linearly polarized signal 422 may be polarized in the same direction, denoted TM01 in FIG. 4. Antenna 412 may be any antenna (e.g., a patch antenna, a helix antenna, a crossed bow antenna, etc.) that can have at least four Internal ports. As an example, FIG. 4 only shows two linearly polarized signals in each polarization direction. However, the number of signals in each polarization direction is not so limited, and the number can be any number greater than 2.

Switching circuit 430 includes a hybrid coupler 442 that receives the first and second linearly polarized signals 416 and 418, and combines the first and second linearly polarized signals 416 and 418 to form a first combined polarized signal 446. Switching circuit 430 also includes a hybrid coupler 444 that receives the third and fourth linearly polarized signals 420 and 422, and combines the third and fourth linearly polarized signals 420 and 422 to form a second combined polarized signal 448. Hybrid coupler 442 and hybrid coupler 444 may be 180° degree hybrid couplers.

Switching circuit 430 includes switch 432 that periodically switches between the first combined polarized signal 446 and the second combined polarized signal 448 to select a polarized signal between the two signals at a point in time. The switching by switch 432 is controlled by a switching signal. The switching signal is similar to switching signal 138 described with respect to FIG. 2, and the detailed description of the switching signal will be omitted here for the sake of brevity.

Switching circuit 430 may include a low noise amplifier (LNA) 434 and a bandpass filter 436 that are similar to LNA 134 and BPF 136 of FIG. 1 and FIG. 2, and the detailed descriptions of LNA 434 and BPF 436 will be omitted here for the sake of brevity. Utilizing a plurality of signals in each polarization direction allows for increased polarization purity.

By combining a plurality of signals provided by a plurality of corresponding feed points in each polarization direction, polarization purity is increased, leading to enhanced accuracy of the operation.

Figure 5:
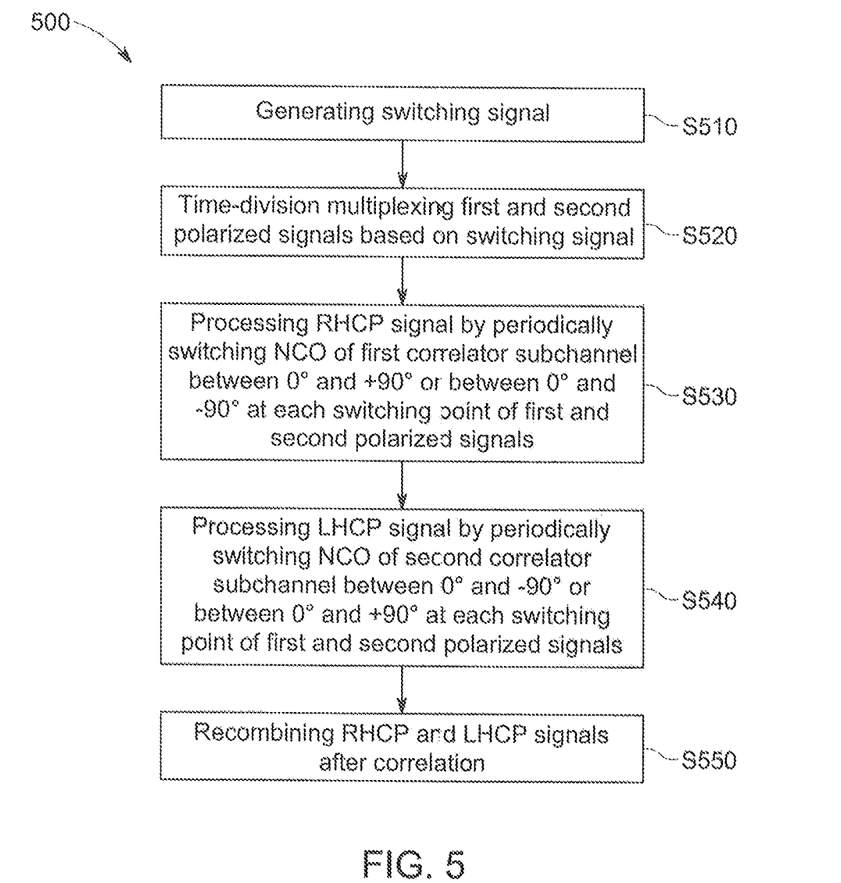
FIG. 5 is a flow chart illustrating an exemplary method for processing a signal, consistent with some embodiments of the present disclosure.

FIG. 5 is a flow chart illustrating an exemplary method 500 for processing a signal, consistent with some embodiments of the present disclosure. The method may be performed by an apparatus, such as apparatus 200 of FIG. 2. Referring to FIG. 5, method 500 includes a step S510 of generating a switching signal. For example, the switching signal may be generated by a receiver, such as receiver 260 of FIG. 2. The switching signal may be a pulse signal or an AC signal. The switching signal may be synchronized by mixing with a local oscillating signal provided by a local oscillator. The switching signal may be transmitted from the receiver to an antenna assembly, such as antenna assembly 210 of FIG. 2.

Method 500 includes a step S520 of time-division multiplexing a first polarized signal and a second polarized signal based on the switching signal. The time-division multiplexed signal may be formed by the antenna assembly, by periodically switching between two feed points of an antenna that receives a GNSS signal and generates a first linearly polarized signal and a second linearly polarized signal, respectively. The switching may be performed by a switching circuit of the antenna assembly, such as switching circuit 130 of FIG. 2, based on the switching signal. The time-division multiplexed signal is transmitted to the receiver for processing. For example, the time-division multiplexed signal is transmitted to a correlator channel of the receiver, such as correlator channel 1 of correlator 262 of FIG. 2.

Method 500 includes a step S530 of processing a RHCP signal. The processing of a RHCP signal may be performed by a first correlator subchannel of the receiver, such as subchannel 1 of correlator channel 1 of correlator 262 of FIG. 2. For example, at least a portion of the time-division multiplexed signal is received by the first correlator subchannel of the receiver and the processing of a RHCP signal may be performed by periodically switching an NCO of the first correlator subchannel between 0° and +90° or between 0° and −90° at each switching point of the first and second polarized signals.

Method 500 includes a step S540 of processing a LHCP signal. The processing of a LHCP signal may be performed by a second correlator subchannel of the receiver, such as subchannel 2 of correlator channel 1 of correlator 262 of FIG. 2. For example, at least a portion of the time-division multiplexed signal is received by the second correlator subchannel of the receiver and the processing of a LHCP signal may be performed by periodically switching an NCO of the second correlator subchannel between 0° and −90° or between 0° and +90° at each switching point of the first and second polarized signals. In an embodiment, step S540 may depend on step S530 so that step S530 determines whether to perform step S530 or how to perform step S540. In another embodiment, step S530 and step S540 may be performed independently.

Method 500 includes a step S550 of recombining the correlated RHCP and LHCP signals. The recombination may be performed by a processing engine of a receiver, such as processing engine 278 of receiver 260 of FIG. 2, by interleaving the correlated RHCP and LHCP signals with the switching signal therebetween.

Figure 6:
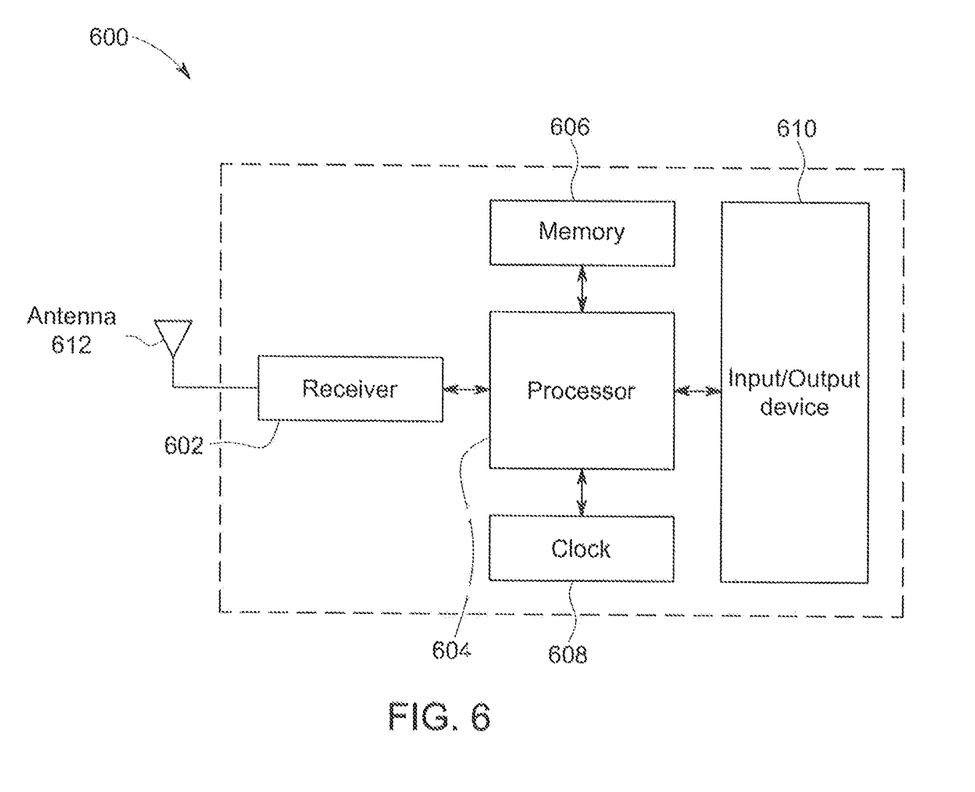
FIG. 6 is a block diagram of a device, consistent with some embodiments of the present disclosure.

FIG. 6 is a block diagram of an exemplary device 600, consistent with some embodiments of the present disclosure. Referring to FIG. 6, device 600 may take any form, including but not limited to, a laptop computer, a GPS, a wireless terminal including a mobile phone, a wireless handheld device, or wireless personal device, or any other forms. Device 600 includes a receiver 602, an antenna 612 coupled with receiver 602, a processor 604, a memory 606, a local clock 608, and an Input/Output device 610.

Receiver 602, coupled to antenna 612, is configured to receive a signal from one or more signal sources. In some embodiments, receiver 602 may be part of a transceiver modern which includes a transmitter configured to transmit data to an external device. Local clock 608 provides a time of a local place at which device 600 is disposed.

In an embodiment, similar to receiver 260 of FIG. 2, receiver 602 may include a correlator including a plurality of correlator channels (not shown), such as correlator 262 of FIG. 2. Each of the plurality of correlator channels may be assigned to a different one of the plurality of signals transmitted from a corresponding one of a plurality of satellites. Each of the plurality of correlator channels may further include a first subchannel and a second subchannel, and the first subchannel and the second subchannel may be configured to process an RHCP signal and a LHCP signal, respectively.

Receiver 602 also includes a switching signal generator that generates a switching signal, such as switching signal generator 276 in FIG. 2. Receiver 602 may also include a processing engine, such as processing engine 278 of FIG. 2. The processing engine may be implemented as a program stored in a computer-readable medium of the receiver. Receiver 602 may include a built-in processor (not shown) configured to execute the program and performs the functions of the processing engine. Receiver 602 may also include other components, such as a bias signal generator. For brevity, descriptions of these components are omitted here.

Processor 604 may include one or more dedicated processing units, application-specific integrated circuits (ASICs), field-programmable gate arrays (FPGAs), or various other types of processors or processing units. Processor 604 may be configured to perform a portion or entire computations in the digital domain signal processing. For example, processor 604 may compute a cross-polarization ratio (XPR) to estimate multipath interference effect and perform a signal clustering analysis using the computed XPR to estimate spoofing effect on each of the plurality of signals respectively transmitted from a plurality of satellites. Processor 604 may be further configured to control the signal processing in receiver 602. In an embodiment, receiver 602 does not have the built-in processor, and processor 604 performs all the functions of the built-in processor. In another embodiment, device 600 does not have processor 604, and the built-in processor of receiver 602 performs all the functions of processor 604.

Memory 606 may be any type of computer-readable storage medium including volatile or non-volatile memory devices, or a combination thereof. Memory 606 may store information related to identities of device 600 and the GNSS signals received by receiver 602. Memory 606 may also store post processing signals including, for example, the correlated RHCP and LHCP signals and the signal obtained by recombining the correlated RHCP and LHCP signals. Memory 606 may also store computer-readable program instructions and mathematical models that are used in signal processing in receiver 602 and computations performed in processor 604. Memory 606 may further store computer-readable program instructions for execution by processor to operate device 600.

Input/Output device 610 may be used to communicate a result of signal processing to a user or another device. Input/output device 610 may comprise a user interface including a display and an input device to transmit a user command to processor 604. The display may be configured to display a status of signal reception at device 600, the data stored at memory 606, a status of signal processing, etc. The display may include, but is not limited to, a cathode ray tube (CRT), a liquid crystal display (LCD), a light-emitting diode (LED), a gas plasma display, a touch screen, or other image projection device for displaying information to a user. The input device may be any type of computer hardware equipment used to receive data and control signals from a user. The input device may include, but is not limited to, a keyboard, a mouse, a scanner, a digital camera, a joystick, a trackball, cursor direction keys, a touchscreen monitor, or audio/video commanders, etc. Output device 610 may further comprise a machine interface, such as an electrical bus connection or a wireless communications link.

The computer-readable storage medium of the present disclosure may be a tangible device that can store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM), a static random access memory (SRAM) a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

The computer-readable program instructions of the present disclosure may be assembler instructions, instruction-set-architecture (ISA) instructions, machine instructions, machine-dependent instructions, microcode, firmware instructions, state-setting data, or source code or object code written in any combination of one or more programming languages, including an object-oriented programming language, and conventional procedural programming languages. The computer-readable program instructions may execute entirely on a computing device as a stand-alone software package, or partly on a first computing device and partly on a second computing device remote from the first computing device. In the latter scenario, the second, remote computing device may be connected to the first computing device through any type of network, including a local area network (LAN) or a wide area network (WAN).

The flowcharts and block diagrams in the figures illustrate examples of the architecture, functionality, and operation of possible implementations of systems, methods, and devices according to various embodiments. It should be noted that, in some alternative implementations, the functions noted in blocks may occur out of the order noted in the figures. For example, two blocks shown in succession may, in fact, be executed substantially concurrently, or the blocks may sometimes be executed in the reverse order, depending upon the functionality involved.

It is understood that the described embodiments are not mutually exclusive, and elements, components, materials, or steps described in connection with one example embodiment may be combined with, or eliminated from, other embodiments in suitable ways to accomplish desired design objectives.

Reference herein to "some embodiments" or "some exemplary embodiments" means that a particular feature, structure, or characteristic described in connection with the embodiment can be included in at least one embodiment. The appearance of the phrases "one embodiment" "some embodiments" or "another embodiment" in various places in the present disclosure do not all necessarily refer to the same embodiment, nor are separate or alternative embodiments necessarily mutually exclusive of other embodiments.

It should be understood that the steps of the example methods set forth herein are not necessarily required to be performed in the order described, and the order of the steps of such methods should be understood to be merely an example. For example, two blocks shown in succession may, in fact, be executed substantially concurrently, or the blocks may sometimes be executed in the reverse order, depending upon the functionality involved. Likewise, additional steps may be included in such methods, and certain steps may be omitted or combined, in methods consistent with various embodiments.

As used in the present disclosure, the word "exemplary" is used herein to mean serving as an example, instance, or illustration. Any aspect or design described herein as "exemplary" is not necessarily to be construed as preferred or advantageous over other aspects or designs. Rather, use of the word is intended to present concepts in a concrete fashion.

As used in the present disclosure, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

Additionally, the articles "a" and "an" as used in the present disclosure and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

Although the elements in the following method claims, if any, are recited in a particular sequence, unless the claim recitations otherwise imply a particular sequence for implementing some or all of those elements, those elements are not necessarily intended to be limited to being implemented in that particular sequence.

It is appreciated that certain features of the present disclosure, which are, for clarity, described in the context of separate embodiments, may also be provided in combination in a single embodiment. Conversely, various features of the specification, which are, for brevity, described in the context of a single embodiment, may also be provided separately or in any suitable subcombination or as suitable in any other described embodiment of the specification. Certain features described in the context of various embodiments are not essential features of those embodiments, unless noted as such.

It will be further understood that various modifications, alternatives and variations in the details, materials, and arrangements of the parts which have been described and illustrated in order to explain the nature of described embodiments may be made by those skilled in the art without departing from the scope. Accordingly, the following claims embrace all such alternatives, modifications and variations that fall within the terms of the claims.

What is claimed is:

1. An apparatus, comprising:
   an antenna assembly, comprising:
   an antenna configured to receive a signal and, based on the received signal, generate a first linearly polarized signal at a first feed point and a second linearly polarized signal at a second feed point; and
   a switching circuit configured to periodically switch between the first feed point and the second feed point to select a polarized signal between the first and second polarized signals at a point in time based on a switching signal,
   wherein the switching signal is a signal that is synchronized with an oscillating signal and controls a switch in the switching circuit to switch between the first feed point and the second feed point, and the switching circuit is configured to time-division multiplex the first and second polarized signals based on the synchronized switching signal, and
   a receiver comprising a correlator that includes a plurality of correlator channels each configured to receive the time-division multiplexed signal, wherein
   each of the plurality of correlator channels further comprises a first subchannel and a second subchannel, and each of the first subchannel and the second subchannel comprises a numerically controlled oscillator coupled to a mixer, the first subchannel is configured to process a right-hand circular polarized (RHCP) signal by periodically switching the numerically controlled oscillator of the first subchannel between 0° and +90° or between 0° and −90° at each switching point of time of the first and second feed points, and the second subchannel is configured to process a left-hand circular polarized (LHCP) signal by switching the numerically controlled oscillator of the second subchannel between 0° and −90° or between 0° and +90° at each switching point of time of the first and second antenna feed points.

2. The apparatus of claim 1,
wherein the receiver is configured to:
generate the switching signal.

3. The apparatus of claim 2, further comprising:
a cable that couples the antenna assembly and the receiver and is configured to:
transmit the time-division multiplexed signal from the antenna assembly to the receiver; and
transmit the generated switching signal from the receiver to the antenna assembly.

4. The apparatus of claim 1, wherein:
the signal received by the antenna comprises a plurality of signals respectively transmitted from a plurality of different satellites, and
each of the plurality of correlator channels is assigned to a different one of the plurality of signals.

5. The apparatus of claim 1, wherein:
the first subchannel and the second subchannel are configured as a master channel and a slave channel, respectively,
the first subchannel is configured to process the RHCP signal, and
the second subchannel is configured to process the LHCP signal based on an instruction of the first subchannel.

6. The apparatus of claim 1, wherein processing the RHCP signal by the first subchannel and processing the LHCP signal by the second subchannel are performed independently.

7. The apparatus of claim 1, wherein each of the plurality of correlator channels further comprises:
a processing engine that combines a correlated RHCP signal and a correlated LHCP signal by interleaving the correlated RHCP and LHCP signals with the switching signal therebetween.

8. The apparatus of claim 1, wherein the receiver further comprises:
a switching signal generator configured to generate as the switching signal a pulse signal including a positive pulse and a negative pulse.

9. The apparatus of claim 8, wherein the first feed point of the antenna is provided with the positive pulse of the switching signal, and the second feed point of the antenna is provided with the negative pulse of the switching signal.

10. The apparatus of claim 1, wherein:
the antenna assembly further comprises:
an amplifier configured to amplify the selected polarized signal; and
a filter configured to receive and filter the amplified signal, and
the receiver further comprises:
a bias circuit configured to provide a direct current (DC) bias to the amplifier of the antenna assembly.

11. The apparatus of claim 1, wherein the signal received by the antenna comprises global navigation satellite system (GNSS) signals, and the first and second polarized signals are in two different orthogonal modes.

* * * * *